United States Patent [19]

Tomoda et al.

[11] 3,927,166

[45] Dec. 16, 1975

[54] METHOD FOR PELLETIZING COMPOSITIONS COMPRISING A NON-CRYSTALLINE OLEFINIC POLYMER OR COPOLYMER, AND A SURFACTANT

[75] Inventors: Sadamichi Tomoda, Kanagawa; Nobuo Nagao, Yokohama, both of Japan

[73] Assignee: Chiba Fine Chemical Co. Ltd., Ichihara, Japan

[22] Filed: Apr. 3, 1970

[21] Appl. No.: 25,563

[30] Foreign Application Priority Data

Apr. 11, 1969 Japan.................................. 44-28121

[52] U.S. Cl................................. 264/144; 264/143
[51] Int. Cl.².............................................. B01J 2/00
[58] Field of Search............................ 264/144, 143

[56] References Cited
UNITED STATES PATENTS

| | | |
|---|---|---|
| 2,697,249 | 12/1954 | Bettes, Jr. et al.................... 264/144 |
| 2,975,483 | 3/1961 | Cooper et al....................... 264/143 |
| 3,023,253 | 2/1962 | Bain et al............................ 264/144 |
| 3,463,751 | 8/1969 | Hasegawa et al.................. 260/23 H |
| 3,476,698 | 11/1969 | Osterrieth et al................. 260/23 H |
| 3,531,559 | 9/1970 | Barfred.............................. 264/144 |

FOREIGN PATENTS OR APPLICATIONS 874,759   8/1961   United Kingdom................. 264/144

*Primary Examiner*—Robert F. White
*Assistant Examiner*—J. R. Hall
*Attorney, Agent, or Firm*—Fred Philpitt

[57] ABSTRACT

A method for producing composition comprising a major amount of a noncrystalline olefinic polymer, a non-crystalline olefinic copolymer or a mixture thereof, and 1 to 30% by weight of a surfactant based upon the total weight of the composition. From the above-mentioned composition, less-sticky pellets can be produced by melting it and then mechanically granulating, for example, by means of pelletizer or flaker.

7 Claims, No Drawings

METHOD FOR PELLETIZING COMPOSITIONS COMPRISING A NON-CRYSTALLINE OLEFINIC POLYMER OR COPOLYMER, AND A SURFACTANT

DETAILED DESCRIPTION OF THE INVENTION

This invention relates to a method for producing pellets by mixing a non-crystalline, olefinic polymer (which will be hereinafter abbreviated as non-crystalline PO) and/or non-crystalline olefinic copolymer (which will be hereinafter abbreviated as non-crystalline COP) and a surfactant.

Non-crystalline PO is formed as a by-product in the production of a crystalline polyolefin (which will be hereinafter abbreviated as crystalline PO) by polymerizing an olefin by the use of a Ziegler type catalyst. Similarly, non-crystalline COP is formed as a by-product in the production of a crystalline, olefinic copolymer (which will be hereinafter referred to as crystalline COP) from two or more kinds of olefins. Both non-crystalline PO and non-crystalline COP have a wide range of molecular weight distribution, and have generally a low melting point, and high thixotropy and stickiness.

A common method for granulating general, thermoplastic polymers is by using an extrusion type pelletizer. However, since non-crystalline PO and non-crystalline COP have the above-mentioned properties, it is difficult to obtain smooth strands suitable for cutting, by the use of an extruder. Further, since these strands are apt to adhere to cutting blades in cutting and since cut pellets also are apt to adhere to each other, it is difficult to use an extruder having a die of many holes. As a result, only an extremely low speed of processing can be realized when an extruder is used.

In such instances of difficult pelletizing, an efficient pelletizing of non-crystalline PO and non-crystalline COP has been attained with regard to non-crystalline polypropylene according to the method of U.S. Pat. No. 3,646,184, entitled "Method for producing less-sticky pellets of amorphous polypropylene" and conceived by inventors including one of the inventors of the present application.

This method consists in melting amorphous polypropylene, attaching the resultant melt to a cooling surface of a rotating, cooling drum, peeling the attached melt off at one end thereof, and cutting the resultant sheet lengthwise and breadthwise to form square pellets.

It is believed that the surface of an attaching layer is quenched in the formation of sheet in the present method and hence a part of a comparatively high molecular weight in atactic polypropylene forms the surface of the sheet, and the resultant sheet does not adhere to the cooling drum.

However, there are also drawbacks in the method of the present invention. When soft atactic polypropylene having an average molecular weight below 30,000 is used, the temperature of cutting blades rises due to the accumulated heat during the time of cutting of the sheet formed on the cooling drum by means of a cutter, the resin adheres to the cutting blades and cutting becomes difficult, and pellets thus produced cause blocking due to a weight pressure when these pellets are put in paper bags or the like, piled and stored.

An object of the present invention is to provide a method for pelletizing non-crystalline polyolefin as well as non-crystalline olefin copolymer, particularly, so-called atactic polypropylene as well as atactic propylene-copolymer having an average molecular weight below 30,000 whose softening temperature is comparatively low and whose pelletizing is difficult even by the use of an extruder or a rotating, cooling drum, with an easiness similar to or better than the customary pelletizing method of other common plastic polymers of high molecular weights.

In order to attain the above-mentioned object, the inventors of the present invention studied various factors for the treatment of non-crystalline PO and non-crystalline COP such as pelletizing apparatus, conditions of pelletizing operation, additives for improving the physical properties of polymers to be used, etc. As a result, it has been found that a composition containing a comparatively large amount of surfactant reduces thixotropic properties when it is heated, melted and rheologically treated, and also reduces stickiness notably at the time of melting, semi-melting and solidification by cooling.

On the other hand, when it is desired to impart an anti-static property, anti-dew property, etc. to various plastics or rubbers by blending in a suitable surfactant in a small amount, such as 1–0.001%, it is generally not easy to blend such an extremely small amount of surfactant directly and uniformly into the above-mentioned, various materials. In such case, however, an efficient blending of these materials can be carried out by utilizing pellets of the composition of the present invention as master batch.

Further, when it is desired to impart an antistatic, anti-dew or the like property to various plastics, rubbers or the like by mixing a suitable surfactant therewith in a small amount of 0.001–1%, it is usually not easy to mix such an estremely small amount of surfactant with the above-mentioned resinous material directly and uniformly. In such case, if the pellets of the composition of the present invention are used as a masterbatch, the pellets can be mixed with the above-mentioned material efficiently.

As for the non-crystalline PO and/or non-crystalline COP to be used in the present invention, non-crystalline PO by-produced in the production of cyrstalline homopolymers from an α-olefin such as ethylene, propylene, butene-1, pentene-1, hexene-1, 4-methyl-pentene-1 or higher α-olefin, or non-crystalline COP by-produced in the production of mainly crystalline block copolymer from two kinds or more of α-olefins such as ethylene, propylene, butene-1, pentene-1, hexene-1, 4-methyl-pentene-1 or higher α-olefin, can be used.

The present invention consists in a method of preparing pellets from a composition comprising a non-crystalline olefinic polymer and/or non-crystalline olefinic copolymer and a surfactant, and containing said surfactant in an amount of 1 to 30% by weight based upon the total weight of the composition.

As one embodiment, the present invention consists in a method for efficiently producing less-sticky pellets of non-crystalline olefinic polymer and/or non-crystalline olefinic copolymer which comprises mixing a polymer selected from non-crystalline olefinic polymers, non-crystalline olefinic copolymers and mixtures thereof with a surfactant selected from anionic, cathionic, nonionic and ampholytic ones in an amount of 1 to 30% by weight based upon the total weight of the resultant mixture, melting the mixture and thereafter mechanically granulating the resultant melt.

As another embodiment, the present invention consists in a method according to the above-mentioned method wherein a by-product having an average molecular weight of 10,000 to 30,000 or more in the production of crystalline copolymer of two or more kinds of olefins is used as non-crystalline olefinic polymer and/or olefinic copolymer, in addition to a by-product in the production of crystalline, olefinic homopolymer.

As a further embodiment, the present invention consists in a method according to the above-mentioned methods wherein an extruder and a pelletizer or a flaker consisting of a melting vessel and a rotating, cooling drum and a square-pelletizing machine are used as an apparatus for producing pellets, and the temperature of the melting liquid at the exit of the extruder or the temperature within the melting vessel is 90° – 220°C.

Surfactants are generally classified into four kinds; anionic, cationic, nonionic and ampholytic and any kind of them can be utilized in the present invention, and non-crystalline PO or non-crystalline COP has a favorable characteristic in that surfactant can be uniformly dispersed in these polymers.

Surfactants, in general use, are usually added to oil or water, in an amount of about 1 – 0.001% by weight, for example, in emulsification of oil in water. But, in the composition of the present invention, it is necessary to blend a surfactant with the polymer in a large amount, such as 1 – 30% by weight based upon the weight of the composition. When a polymer having a relatively low stickiness is used, an incorporation of 1 to a few % may be sufficient, while when a polymer having a high stickiness and a strong thixotropy is used, it is often found that a composition having physical properties capable of smoothly pelletizing cannot be obtained, unless an amount above 5% and sometimes above 20% is used.

On the other hand, an incorporation of surfactant in an amount above 31% causes a reduction in the viscoelasticity of the melt of the composition, and this results in a difficult pelletization. It goes without saying that the most suitable amount of incorporation is somewhat different according to the kind of surfactant.

When a suitable amount of surfactant is blended into non-crystalline PO or non-crystalline COP, and the resultant blend is treated by means of an extruder type pelletizer or the above-mentioned cooling drum type pelletizer, the production of strand by the extrusion from an extruder or that of sheet by its formation on the cooling drum can be smoothly carried out, and since the surface of such strand or sheet is less-sticky and also suitably hard, the adhesion of a pellet to cutting blade or other pellets scarcely occurs in the pelletization by cutting with a cutting blade. Further, even if the pellets thus produced and put in bags, are piled and stored for a long period of time, they cause no blocking.

The surfactant-containing composition in pellet form of the present invention has many and various applications.

It can be blended with polyolefins, other various synthetic resins, natural resins, rubber, asphalt, pitch, rolling lubricant, lubricating oil, etc., and blending operation in such case is easy.

Further, the surfactant in the blended composition, can act as an antistatic or anti-dew additive for plastic shaped articles, foam, film, sheet, paint and lacquer, rubber products, paving materials, etc. or as a dispensible additive for pigments, fillers, etc. Besides, it can be used as a raw material for various, prepared oily materials, emulsions or the like.

The present invention is illustrated by the following Examples, but claims and scope thereof are not to be limited by these Examples.

EXAMPLE 1

90 parts by weight of non-crystalline propylene-ethylene copolymer whose molecular weight and ethylene content are 30,000 and 3%, respectively, and 10 parts by weight of sorbitan monostearate (a nonionic surfactant), were mixed and melted in a melting vessel, and the resultant melted resin was attached on a flaker (a rotating, cooling drum) to make a sheet of 3mm thick, which was cut by a square-pelletizing machine into square-pellets of 3×3×3 mm.

For comparison, the above-mentioned non-crystalline propylene-ethylene copolymer was solely used in preparing pellets of the same size using the same melting vessel, flaker and square-pelletizing machine. Thus, the maximum production rate of the former case (the present invention) was 200 kg/hr. per $m^2$ of the surface of the cooling drum, while that of the latter case was 80 kg/hr. per $m^2$.

Further, two kinds of pellets were each put in paper bags in an amount of 20 kg, and stored under a load of 50 kg, at room temperature for 1 month. As a result, the former pellets caused no blocking, while the latter caused a slight blocking partially.

The above-mentioned composition is useful as a masterbatch for an anti-dew agent which is added to polypropylene, polyethylene, ethylene-vinyl acetate copolymer, etc.

EXAMPLE 2

80 parts by weight of non-crystalline polyethylene which is a by-product of low-pressure process polyethylene and whose molecular weight and melting point are 10,000 and 100°C, respectively, and 20 parts by weight of sodium oleate (an anionic surfactant), were mixed in advance, and then granulated by means of an extrusion type pelletizer (extrusion temperature: 120°C). The stickiness of the pellets thus obtained was examined similarly to Example 1. No blocking occurred. The thus produced pellets can be used as a raw material for non-crystalline polyethylene emulsion, a paving material, etc.

EXAMPLE 3

90 parts by weight of non-crystalline polypropylene having a molecular weight of 20,000, and 10 parts by weight of sodium alkyl-benzenesulfonate (an anionic surfactant), were mixed, melted in a melting vessel, and kept at 150°C. The melt was then made by means of a flaker into a sheet of 2 mm thick, which was cut lengthwise and breadthwise by means of a square-pelletizing machine to produce square pellets of 2×3×3×mm.

The maximum production rate was 150 kg/hr. per $m^2$ of the surface of the coding drum.

The stickiness of the pellets thus produced was examined similarly to Example 1. No blocking occurred. These pellets can be used as a raw material for paper-coating, water-repelling agent, an agent for improving water-proof property of grease, etc.

EXAMPLE 4

97 parts by weight of atactic polypropylene having a molecular weight of 25,000, and 3 parts by weight of lauryl trimethyl ammonium chloride (a cathionic surfactant) were mixed in advance, and then granulated by means of an extrusion type pelletizer, at an exit temperature of 100°C. The pellets thus produced were subjected to a load test similar to Example 1. No blocking occurred.

The composition thus obtained are useful as a masterbatch for an antistatic agent to shaped articles of polypropylene or polyethylene.

EXAMPLE 5

95 parts by weight of non-crystalline propylene-butene-1-copolymer which is a terminal block copolymer wherein butene-1 is block-copolymerized at the molecular end of isotactic polypropylene, and whose molecular weight and butene-1 content are 40,000 and 2%, respectively, and 5 parts by weight of lauryl dimethylbetaine (an ampholytic surfactant of betaine type), were mixed and melted in a melting vessel, and the temperature of the melt was kept at 210°C. The melt was attached to a flaker (a rotating, cooling drum) the lower end of which is dipped in the melting vessel to make a sheet of 3 mm thick, which was cut by means of a square-pelletizing machine to produce square pellets of 3×3×3 mm.

For comparison, the above-mentioned non-crystalline propylene-butene-1 copolymer was solely used, and pellets of the same size were prepared using the same melting vessel, flaker and square-pelletizing machine. The maximum production rate of the former case (the present invention) was 300 kg/hr. per m² of the surface of the cooling drum, while that of the latter was 100 kg/hr. per m².

Two kinds of pellets thus obtained were subjected to a load test similar to Example 1. The former caused no blocking, while the latter caused a partial, slight blocking.

The pellets of the composition thus produced are useful as a masterbatch for antistatic agent.

What is claimed is:

1. An improved method for producing pellets of a material selected from the group consisting of non-crystalline olefinic polymers and non-crystalline olefinic copolymers and mixtures thereof, said material being a by-product of the production of crystalline olefinic polymers and having an average molecular weight of 10,000 to 40,000 which consists essentially in mixing said material with a surfactant selected from the group consisting of anionic, cationic, nonionic or ampholytic surfactants in an amount of 1 to 30% by weight based upon the total weight of the resultant mixture, melt-extruding the resulting mixture and cooling, solidifying and pelletizing the resulting melt-extrudate, the temperature of the melt at the exit of the melt-extruding means being within the range of 90° to 220°C.

2. An improved method for producing pellets of a material selected from the group consisting of non-crystalline olefinic polymers and non-crystalline olefinic copolymers and mixtures thereof, which consists essentially in mixing said material with a surfactant selected from the group consisting of anionic, cationic, nonionic or ampholytic surfactants in an amount of 1 to 30% by weight based upon the total weight of the resultant mixture, melt-extruding the resulting mixture and cooling, solidifying and pelletizing the resulting melt-extrudate.

3. A method according to claim 2 wherein the temperature of the melt at the exit of the melt-extruding means is within the range of from 90° to 220°C.

4. A method according to claim 2 wherein said material is a by-product in the production of crystalline, olefinic homopolymer.

5. A method according to claim 2 wherein said material is a by-product having an average molecular weight of 10,000 to 40,000 in the production of crystalline copolymer of two or more kinds of olefins.

6. An improved method for producing pellets of a material selected from the group consisting of non-crystalline olefinic polymers and non-cyrstalline olefinic copolymers and mixtures thereof, which consists essentially in mixing said material with a surfactant selected from the group consisting of anionic, cationic, nonionic or ampholytic surfactants in an amount of 1 to 30% by weight based upon the total weight of the resultant mixture, melting the mixture in a melting means and thereafter sheet-making and cooling, solidifying and cutting the resultant melt into pellets.

7. A method according to claim 6 wherein the temperature within the melting means is within the range of from 90° to 220°C.

* * * * *